Patented July 3, 1923.

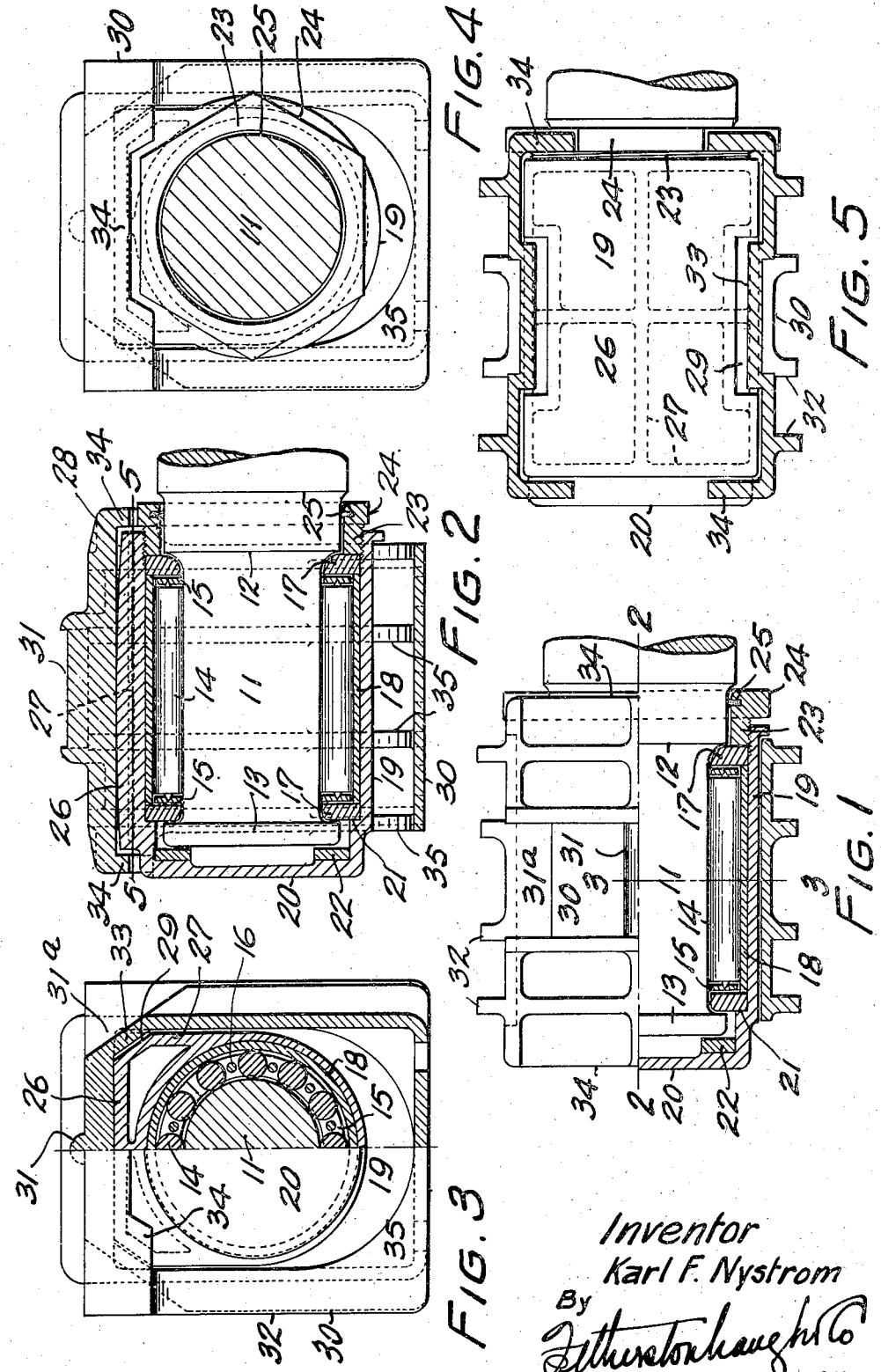

1,460,802

UNITED STATES PATENT OFFICE.

KARL F. NYSTROM, OF MONTREAL, QUEBEC, CANADA.

RAILWAY-CAR-JOURNAL ROLLER BEARING.

Application filed June 11, 1921. Serial No. 476,775.

*To all whom it may concern:*

Be it known that I, KARL F. NYSTROM, a subject of the King of Great Britain, and resident of the city of Montreal, in the Province of Quebec and Dominion of Canada, have invented certain new and useful Improvements in Railway-Car-Journal Roller Bearings, of which the following is a full, clear, and exact description.

This invention relates to improvements in railway car journal roller bearings, and the object of the invention is to provide a bearing applicable to existing journals without alteration thereof.

A further object is to provide a bearing which will not occupy any greater space than that provided in the ordinary journal box and which will also permit of an outer casing of the same essential contour and dimensions as a standard journal box.

A still further object is to provide for end thrust and also for relative oscillation of the journal and box.

Another object is to provide means to protect the bearing against tampering and also against the entrance of dust.

Still another object is to provide a dust ring so constructed and arranged that it will not be injured by relative oscillation of the journal and box.

Still another object is to provide simple and effective means for locking the bearing in any adjustment to which it may be set.

The present invention resides in providing a roller bearing in two halves designed to be assembled around the journal of the axle and retained in assembled position by a suitable sleeve, which constitutes a raceway for the rollers of the bearing. The assembled bearing is enclosed in a housing free to move vertically and to oscillate in a journal box having the essential external dimensions of a standard journal box. The outer end of the housing is closed and guards the bearing against tampering. The adjustment of the bearing is effected by a screwed-in-collar at the inner end of the housing, which collar is provided with a polygonal head to adapt it for rotation by means of a spanner. The inner end of the journal box is made to embrace the head of the adjusting ring so as to normally hold the same against rotation. The dust guard of the bearing is mounted in the adjusting ring and therefore remains always concentric with the journal and entirely unaffected by relative oscillation of the journal and box.

In the drawings which illustrate the invention;—

Fig. 1 is a view half in plan and half in horizontal section at the centre of the journal.

Fig. 2 is a vertical section on the line 2—2, Figure 1.

Fig. 3 is a view showing a half outer end elevation and a half vertical cross section on the line 3—3, Figure 1.

Fig. 4 is an elevation of the inner end of the device.

Fig. 5 is a section of the box on the line 5—5, Figure 2, the bearing being in plan.

Referring more particularly to the drawings, 11 designates a standard railway car journal having at the inner end a shoulder 12 and at the outer end a shoulder or flange 13. The bearing proper is of any usual roller type and may comprise rollers 14 mounted in any suitable manner between end rings 15, which are held in properly spaced relation by bolts or rivets 16. The bolts and rivets constitute a cage holding the rollers in parallelism and properly spaced relation in the well known manner and this cage is diametrically divided into two parts to permit of its assembly between the shoulders 12 and 13 of the journal. It will be noted that the cage is somewhat shorter than the journal and thus permits of the assembly of thrust rings 17 between the cage and the journal shoulders. The bearing is preferably enclosed in a sleeve 18 of suitably hardened material which may be seamless or split and which serves to hold the two halves of the bearing together and forms a race-way for the rollers. The bearing sleeve and thrust rings are enclosed in a substantially cylindrical housing 19 closed at its outer end 20 and provided with a seat or shoulder 21 for the outer thrust ring 17. This housing is a nice fit around the sleeve 18 so that the sleeve will be merely in compression between the rollers and housing and will be sufficiently tight in the housing to prevent rattling, rotation or rolling out to larger diameter. The outer end of the housing may be reinforced by a thrust ring 22 adapted to bear against the end of the axle. The inner end of the housing is internally screw-threaded for the reception of an adjusting ring 23, having a polygonally formed rim or flange 24 by which it may be rotated. Any suitable part of the ring may carry a dust brush or washer 25 of felt or the like of a size to bear against the axle inside the journal to exclude dust in the well-known manner. The substantially cylindrical casing 19 is provided with a substantially flat-topped superstructure 26, which extends the full width and length of the casing and is supported at its periphery and on lines within the periphery by ribs 27 springing from the cylindrical casing. This superstructure is designed to form a medium for transmitting load between the bearing and the journal box in the same manner as the wedges used in standard journal boxes. The superstructure also serves as a rocker bearing to permit relative oscillation of the journal and box and further serves to limit end thrust. Additionally, the superstructure serves to hold the casing in a journal box. While the superstructure is substantially flat-topped, as previously stated, it nevertheless is very slightly curved from the centre toward the ends, as shown at 28, and may be provided on its side edges with notches 29.

The casing 19 is housed in a journal box 30, which is of substantially the usual shape and proportions and is externally of the same essential dimensions as a standard journal box. The journal box illustrated is designed for passenger car service and has at the top the usual seat 31 for an equalizer and at the sides the usual ribs 32 to embrace pedestals. The box is substantially rectangular, being internally flat-topped to provide a seat for the superstructure of the casing 19, upon which the whole casing may oscillate. In reality, the movement of the casing in the box is a rolling one but the movement is so limited that it may be regarded and described as oscillation. The upper edges of a box of the passenger car type may be notched at 31ª to give clearance for equalizers and this notching will produce internal projections 33 adapted to engage loosely in the notches 29 of the casing superstructure. This interengagement of the casing and boxes provides means for limiting the relative axial movement of the casing and box. In order to retain the casing in the box, the top of the latter is provided at both inner and outer ends with a depending flange 34 which may be somewhat deeper adjacent the corners of the box than in the central portion. The box may be internally strengthened in its lower part by ribs 35 curved at their free edges in substantial conformity with the curvature of the lower part of the casing. The projection of the flanges 34 and ribs 35 from the walls of the box is such that, when the casing is lowered into substantial contact with the ribs 35, the top of the casing will just clear the lower edges of the flanges 34, so that the casing may be withdrawn from the box. The shaping of the lower edge of the inner flange 34 is such that it conforms approximately to the shape of the flange 24 and partially embraces this flange when the parts are in operative position to hold the ring 23 against rotation.

It will be understood that while this invention has been described with relation to a passenger car journal, it is applicable equally to a freight car journal and that under such circumstances the box projection 33 and casing notches 29 may be located somewhat differently and also that the external details of the box will be altered to conform with the essential external details of freight car journal boxes. It will also be understood that in a number of minor details the exact construction illustrated may be departed from, without departing from the spirit of the invention, as the construction shown and described is purely illustrative.

In assembling a bearing of the structure illustrated, the two halves of the cage carrying the rollers are brought together around the journal between the end shoulders 12 and 13 thereof and the assembled cage is held by slipping the sleeve 18 thereover. The adjusting ring 23 is now slipped on over the end of the axle and positioned inside the shoulder 12. The split thrust rings 17 are next assembled around the journal at the ends of the bearing and are held by sliding on the casing 19. The adjusting ring 23 is screwed into the inner end of the casing until the thrust rings and sleeve 18 bear tightly against one another and the outer end thrust ring is seated securely on the casing shoulder 21. The assembly of the bearing itself is now complete. While it is preferred to have the thrust rings 17 abut the ends of the sleeve 18, the invention is not limited in this respect. The journal box 30 is slipped over the casing and shifted vertically, so that the casing superstructure engages between the end flanges 34 of the box. When applied to a journal, the casing will usually assume an inverted position owing to the weight of the superstructure seeking the lowest point. This makes it convenient to apply the journal box also in inverted position, so that the ribs 35 thereof slide over the curved portion of the casing. The journal box and casing can then be easily rotated to proper position, with the result that the box will settle down on the casing and receive the superstructure thereof in operative position. The journal box is then assembled in a truck in the usual manner.

The load is applied to the journal through the box, upper part of the casing and the roller bearing. When the journal is rotated within the box, the roller bearing rotates at lowest speed within the sleeve 18 in the well known manner. It will be observed that there is a slight clearance between the shoulders 12 and 13 and the thrust rings 17, and also between the end flange of the journal and the thrust ring 22. These clearances permit a slight axial movement of the journal in its bearing such as is bound to occur. When the axial movement exceeds the normal play, as for instance in travelling around a curve, the thrust is transmitted by the end flange 13 of the journal to the casing either through the ring 17 or through the ring 22 and the casing then moves axially in the box within the limits provided by their interengagement and by the flanges 34. The shoulder 12 will upon axial movement of the journal in one direction co-operate with the shoulder flange 13 in transmitting end thrust, but will not so act in any individual journal upon movement in the opposite direction. This apparent inequality of thrust transmitting surface is, however, compensated for by the fact that when the bearings are properly adjusted the thrust is transmitted equally at both ends of the axle. Differences in rail level cause constant relative rise and fall at the opposite ends of an axle, which causes the journals to oscillate very slightly relatively to the boxes. This oscillation does not affect the load transmission and is not resisted by reason of the slightly curved surface of the casing, which rolls as necessary against the top of the box. It will be observed that the dust brush 25 is mounted in effect on the casing 19, which is held at all times concentric with the journal, so that there is no eccentric displacement of the brush relative to the axle and consequently no flattening of the brush, which would in time produce a clearance between it and the axle through which grit would enter. This is a very important feature, especially in railroad work, where the journal boxes operate almost continuously in clouds of dust and the loads are very heavy, so that a small amount of grit will produce very rapid wearing and heating of a journal or bearing. As the transmission of end thrust previously described depends upon the relative rigidity of the thrust rings and casing, it will be understood that any loosening of the adjusting ring 23 which would enable relative movement of the parts would soon result in the bearing pounding to pieces. The interengagement of the adjusting ring and box flange 34 to hold the ring against rotation provides a reliable locking device for the ring and also guards considerably against unauthorized adjustment of the ring, as the box must be jacked up sufficiently to clear the ring flange before the ring can be moved. While the hexagonal shape of flange 24 is preferred, it will be understood that the invention is not limited in this respect.

While the box differs considerably in appearance from a standard journal box of the same type, there is nevertheless very little actual difference. The external features and dimensions of the standard box is preserved and also the internal features and dimensions at the top of the standard box. This enables in emergency an ordinary friction bearing to be substituted for a broken roller bearing. The broken roller bearing is removed and the ordinary friction bearing and wedge inserted in the upper part of the box, which is of a shape suitable to co-operate with a standard wedge. The lower part of the box can be packed with oily waste and, although the lubrication will not be perfect, nor the journal dust-proof, it will permit of a car being run to the nearest station or perhaps even to a divisional or repair point.

While the bearing has been shown and described as including a cage to position the rollers and facilitate handling thereof and also as including a sleeve separate from the casing, it will be understood that the invention is not limited to the inclusion either of a cage or of a sleeve or both.

Having thus described my invention, what I claim is:—

1. A railway journal bearing comprising a journal box, a casing irrevolubly mounted therein, a series of rolling elements within the casing disposed to travel on the inner surface thereof, an adjusting ring secured to the casing to hold the rolling elements therein, and a flange on the journal box adapted to engage said ring and hold the same against rotation independently of the casing when located in the box.

2. In a railway journal bearing, a rolling element carrying cage, a casing enclosing the cage and a journal box enclosing the casing, said casing having projections therefrom holding the same against rotation in the box and slidably and rockably supporting the casing in the box, and projections from the box positioned to limit the sliding movement of the casing therein.

3. In a railway journal bearing, the combination with a journal having upstanding shoulders at each end thereof, a rolling element carrying cage on the journal between the shoulders thereof, a casing enclosing the cage and a journal box enclosing the casing, means carried by the casing to engage the journal shoulders and limit movement thereof relative to the casing in the axial direction, and means carried by the box positioned to limit movement of the casing relative to the box in the axial direction.

4. In a railway journal bearing, the combination with a journal of a rolling element carrying cage, a casing surrounding the cage and a journal box surrounding the casing, means carried by the casing limiting endwise movement of the journal in the bearing and transmitting journal endwise movement to the casing, and means carried by the box limiting endwise movement of the casing transmitted to it from the journal.

5. In a railway journal bearing, a split rolling element carrying cage, a sleeve surrounding the cage and holding the same in assembled position around a journal and forming a rolling element race-way, a casing surrounding the sleeve a seat at the outer end of said casing to limit outward movement of the sleeve, and an adjusting ring threaded into the inner end of the casing to urge said sleeve toward the seat.

6. In a railroad journal bearing, a split rolling element carrying cage, a sleeve surrounding the cage and holding the same in assembled position around a journal and forming a rolling element raceway, a casing surrounding the sleeve, a seat at the outer end of said casing to limit outward movement of the sleeve, an adjustable ring at the inner end of the case to urge said sleeve toward the seat and thrust rings at the ends of the cage held rigidly between the seat and adjustible ring, and adapted to engage the end shoulders of a journal.

7. A railroad journal bearing comprising a rolling element carrying cage, a sleeve surrounding the cage and forming a rolling element race-way, a casing inclosing the sleeve, an adjusting ring threaded into the casing and holding the sleeve therein, a journal box surrounding the case and a flange on the box adapted to hold the ring against rotation independently of the casing.

In witness whereof, I have hereunto set my hand.

KARL F. NYSTROM.